United States Patent

Kawano

[11] Patent Number: 5,590,033
[45] Date of Patent: Dec. 31, 1996

[54] POWER SOURCE APPARATUS

[75] Inventor: Toshihiko Kawano, Hamamatsu, Japan

[73] Assignee: Yamaha Corporation, Hamamatsu, Japan

[21] Appl. No.: 32,728

[22] Filed: Mar. 16, 1993

Related U.S. Application Data

[63] Continuation of Ser. No. 705,102, May 24, 1991, abandoned, which is a continuation-in-part of Ser. No. 397,575, Aug. 23, 1989, abandoned.

[30] Foreign Application Priority Data

Sep. 2, 1988 [JP] Japan .................. 63-115037

[51] Int. Cl.⁶ .................. H02M 3/335
[52] U.S. Cl. .................. 363/25; 363/26; 363/41; 363/98
[58] Field of Search .................. 363/16, 24, 25, 363/26, 41, 97, 98, 132, 133, 134, 49, 18–23; H02M 3/335

[56] References Cited

U.S. PATENT DOCUMENTS

| | | | |
|---|---|---|---|
| 3,818,128 | 6/1974 | Chambers et al. | 363/26 |
| 3,958,169 | 5/1976 | Hergenhan | 321/2 |
| 4,205,283 | 5/1980 | Donnally, Jr. | 333/165 |
| 4,208,706 | 6/1980 | Suzuki et al. | 363/26 |
| 4,243,958 | 1/1981 | Wilde | 333/165 |
| 4,272,690 | 6/1981 | Riney et al. | 363/26 |
| 4,348,719 | 9/1982 | Hicks et al. | 363/16 |
| 4,424,557 | 1/1984 | Steigerwald | 363/41 |
| 4,480,297 | 10/1984 | Chetty et al. | 363/26 |
| 4,489,371 | 12/1984 | Kernick | 363/98 |
| 4,535,399 | 8/1985 | Szepesi | 363/16 |
| 4,788,451 | 11/1988 | Stoet | 363/26 |
| 4,843,532 | 6/1989 | Freedman | 363/26 |
| 5,027,255 | 6/1991 | Zeitlin et al. | 361/395 |
| 5,270,904 | 12/1993 | Gulczynski | 363/97 |

FOREIGN PATENT DOCUMENTS

| | | |
|---|---|---|
| 59-172977 | 9/1984 | Japan . |
| 61-25089 | 2/1986 | Japan . |
| 62-14860 | 1/1987 | Japan . |

*Primary Examiner*—Peter S. Wong
*Assistant Examiner*—Adolf Berhane
*Attorney, Agent, or Firm*— Loeb & Loeb LLP

[57] ABSTRACT

A power source apparatus comprises a DC power source, a switching element, and a controller for performing an ON/OFF operation of said switching element at a predetermined switching frequency. The power source apparatus chops an output from the DC power source to control a DC output to be supplied to a load, or temporarily converts the output from the DC power source into an AC voltage to transform the DC voltage and supplies the transformed voltage to said load. The controller includes an external clock input terminal and a sync circuit for causing the switching frequency to coincide with a frequency of a clock applied to said external clock input terminal or a frequency which is an integer multiple of the frequency of the clock.

10 Claims, 6 Drawing Sheets

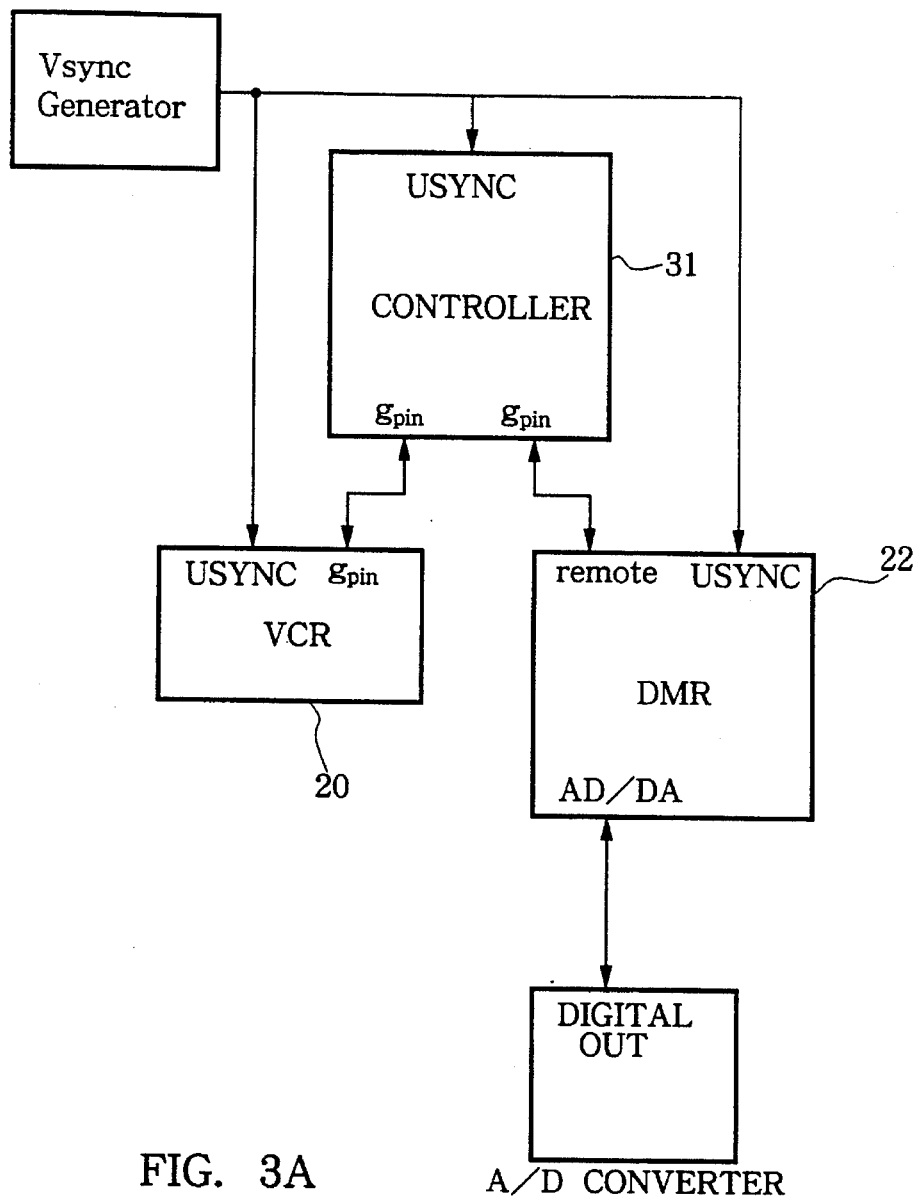
FIG. 3A
| TRACK No. | |
|---|---|
| TR1 | |
| TR2 | |
| ⋮ | ⋮ |
| TRN | |
FIG. 3B
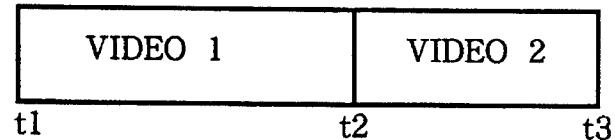
FIG. 3C

POWER SOURCE APPARATUS

This is a continuation of application of application Ser. No. 07/705,102 filed on May 24, 1991, now abandoned. Which is a continuation-in-part of Ser. No. 7/397,575 of Toshihiko Kawano for "Power Source Apparatus", which application was filed Aug. 23, 1989, now abandoned.

BACKGROUND OF THE INVENTION

1. Field of the Invention

The present invention relates to a power source apparatus such as a so-called switching regulator for switching a DC input to obtain a desired DC output and to stabilize the DC output and a DC-to-DC converter for transforming a DC voltage and, more particularly, to a power source apparatus suitable for a digital processing apparatus having an internal clock signal with a predetermined frequency.

2. Description of the Prior Art

A switching power source such as a switching regulator is often mounted on a digital processing apparatus such as a digital audio equipment as a DC power source in consideration of size, heat generation, and the like. In this case, a switching frequency of the switching power source is set to be independent from a master clock frequency, a signal processing sampling frequency, and the like in the digital equipment on which the switching power source is mounted.

For this reason, in a conventional digital processing apparatus, a switching frequency of the switching power source is often different from a master clock frequency of the digital processing apparatus or a frequency obtained by dividing the master clock frequency. Leaked signals having different frequencies cause a beat which generates disturbing noise in an audio band.

In particular, a sampling signal having a frequency relatively approximate to an audio frequency of, e.g., 48 kHz or 44.1 kHz is used in the digital audio equipment. Therefore, it is highly possible that a frequency of a beat which is a difference between the sampling signal or its harmonic and the above-mentioned switching frequency or its harmonic may be an audio frequency.

In the digital audio equipment, a sampling frequency is often varied for the purpose of pitch control or the like. In this case, however, since a beat frequency determined in accordance with the sampling frequency and a switching frequency of the switching power source changes, disturbing noise is often generated.

SUMMARY OF THE INVENTION

The present invention has been made to solve the problems of the above-mentioned prior art, and has as its object to provide a power source apparatus which operates at a switching frequency corresponding to an operation clock frequency such as a master clock frequency and a signal processing sampling frequency, in a digital processing apparatus on which the power source is mounted, thus preventing generation of a beat.

In order to achieve the above object, the power source apparatus according to the present invention receives an operation clock having, e.g., a signal processing sampling frequency or a clock having a frequency which is an integer multiple of the operation clock from the digital processing apparatus serving as a load on which the power source apparatus is mounted. Therefore, the switching frequency coincides with the frequency of the operation clock or the frequency which is an integer multiple of the operation clock.

For example, a PLL (phase-locked loop) circuit can be used as a circuit for causing the switching frequency to coincide with the frequency of the operation clock.

In the power source apparatus of the present invention, on the basis of an operation clock supplied from the digital processing apparatus on which the power source apparatus is mounted, a frequency N times (N is an integer of 1 or more) that of the operation clock is set as a switching frequency. Therefore, when the multiplier N is set so that a difference between the switching frequency and its harmonic and each operation clock frequency and its harmonic is "0" or a frequency in a band except for an audio frequency band, a beat is not generated, or a beat is not recognized as noise even if the beat is generated.

As described above, when the sampling frequency is varied for a pitch control operation, the switching frequency changes in accordance with the sampling frequency. Therefore, even if the pitch control operation or the like is performed, disturbing noise due to the beat is not generated.

BRIEF DESCRIPTION OF THE DRAWINGS

FIG. 3 a-c are circuit diagrams showing an example of a remote chase connection;

DETAILED DESCRIPTION OF THE PREFERRED EMBODIMENT

The power source apparatus according to the present invention is applied to, for example, a digital recording apparatus (herein after referred to as DMR) which is produced by the present applicant. First of all, a preferred embodiment of the present invention will be described below by reference to the use of the DMR.

Figure 1:
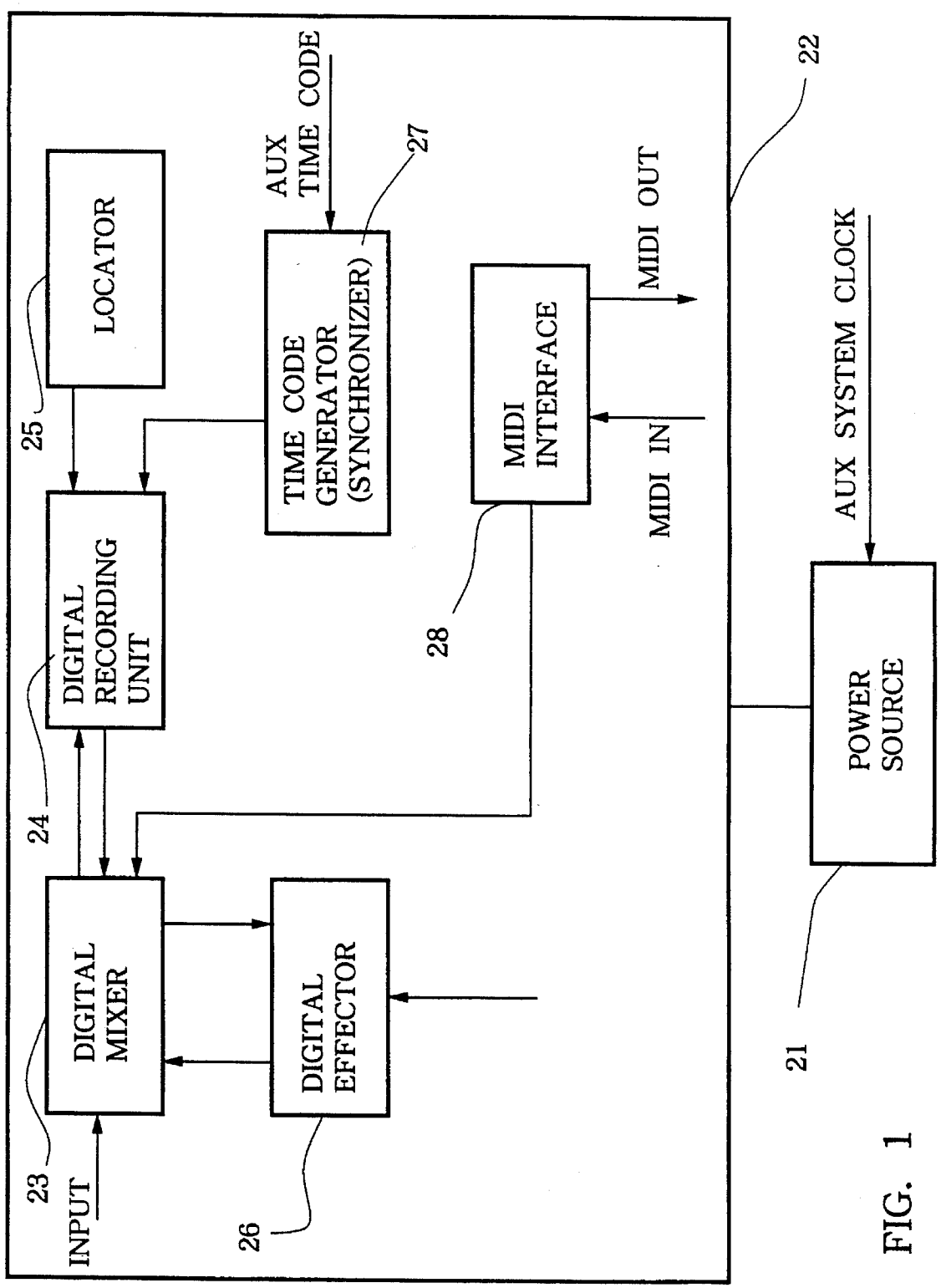
FIG. 1 is a circuit diagram of a digital recording apparatus according to the present invention.

The whole constitution of the DMR is shown in FIG. 1. The DMR 22 comprises a digital mixer 23, a digital recording unit 24, a locator 25, a digital effector 26, a time code generator 27 and a MIDI interface 28, and further comprises a power source 21 according to the present invention.

The digital mixer 23 effects a level control and gives effects on external input signals, signals outputted from the digital recording unit 24, or the like.

The digital recording unit 24 not only records the external input signals but also can be connected as a slave to a master DMR to operate in accordance with the master DMR. A case in which the DMR 22 is connected with other apparatus will be described later.

The locator 25 has functions that register an arbitrary tape position or time during the running of the tape, cause the tape to move to an arbitrary position (hereinafter referred to as "locate"), and play back between two arbitrary positions on a tape on the basis of the absolute time data of the DMR (to be referred to as "time code" hereinafter), the absolute time being recorded on the tape together with sound data.

The digital effector 26 has three effector systems. It controls reverberation, a chorus effect, delay time, an echo and the like, according to the operation of an operation member set up at an operating unit.

The time code generator 27 generates said time code. In this apparatus, the time code generator 27 is operated by using a counter which is controlled with absolute time complying with a so-called SMPTE method. The time code generated by the time code generator 27 is supplied to the digital recording unit 24 and is recorded on a tape together with data.

The MIDI interface 28 is used when the DMR is controlled by MIDI time code or MIDI command other than the MIDI time code.

The constitution of the power source 21 will be described later.

Modes used when an external digital apparatus is connected to the DMR will be described below.

These modes are 1) external time code synchronous mode, 2) MIDI time code synchronous mode and 3) DMR synchronous mode.

Figure 2:
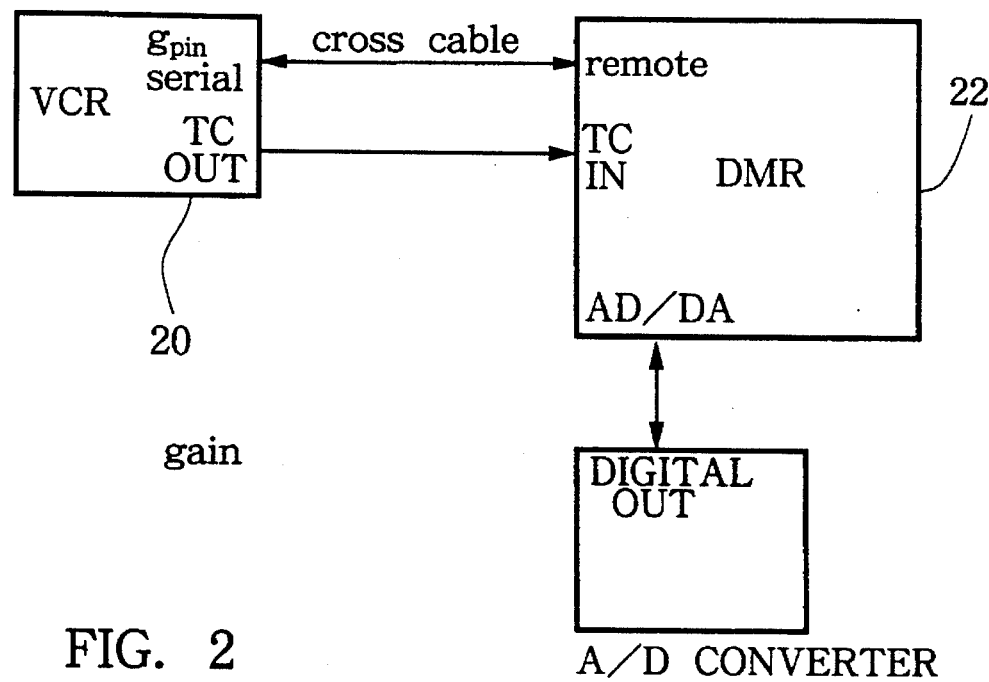
FIG. 2 is a circuit diagram showing an example of an external time code connection in which g-pin is used.

1) External time code synchronous mode (FIG. 2)

This mode includes i) point chase mode, ii) all chase mode and iii) remote chase mode.

i) point chase mode

This mode is one which, when an external time code is inputted from the external side as shown in FIG. 2 (in FIG. 2, the DMR 22 is connected with a VCR (video cassette recorder) 20), changes the device speed of the DMR 22 (because the system clock of the DMR is changed, the rotation speed of the motor at the time of recording or playback (reproduction) changes according to the clock frequency) to follow the external time code (hereinafter referred to as "chase") while raising the clock frequency of each clock by $\frac{1}{100}$ octave from a point when the absolute time represented by the inner time code of the DMR becomes equal to a preset time code to a point when no difference between the inner time code and the external time code is made. Usually, this mode is used when the preset time code precedes the present external time code. When the present external time code is apart from the DMRTC (the time code of the DMR 22) by ±10 frames or more, the DMR 22 memorizes the external time code at that time to forward the tape of the DMR rapidly to a position corresponding to a value obtained by adding up a predetermined value (located preroll value) and the value of the memorized time code.

ii) all chase mode

This mode is one wherein, under a condition where an external time code is inputted from external and when the present external time code is apart from the inner time code of the DMR by over ±10 frames, the DMR forwards or rewinds the tape of the DMR rapidly as far as a position corresponding to a value obtained by adding a predetermined value to the value of the present external time code, then chases or follows the time code by changing the speed of the DMR until no difference between the inner time code and the external time code is made.

iii) remote chase mode (FIG. 3)

This mode is used when the audio information of the DMR 22 is synchronized and combined with the video information of a VCR 20. In this case, synchronization beginning time (in-point) and synchronization ending time (out-point) are set up for both of VCR 20 and DMR 22. A controller 31 assigns and controls these points. For example, the audio information for one track (refer to FIG. 3B) of DMR for a predetermined period of time is assigned to video information 1 (refer to FIG. 3C) from predetermined time t1 to t2.

Figure 4:
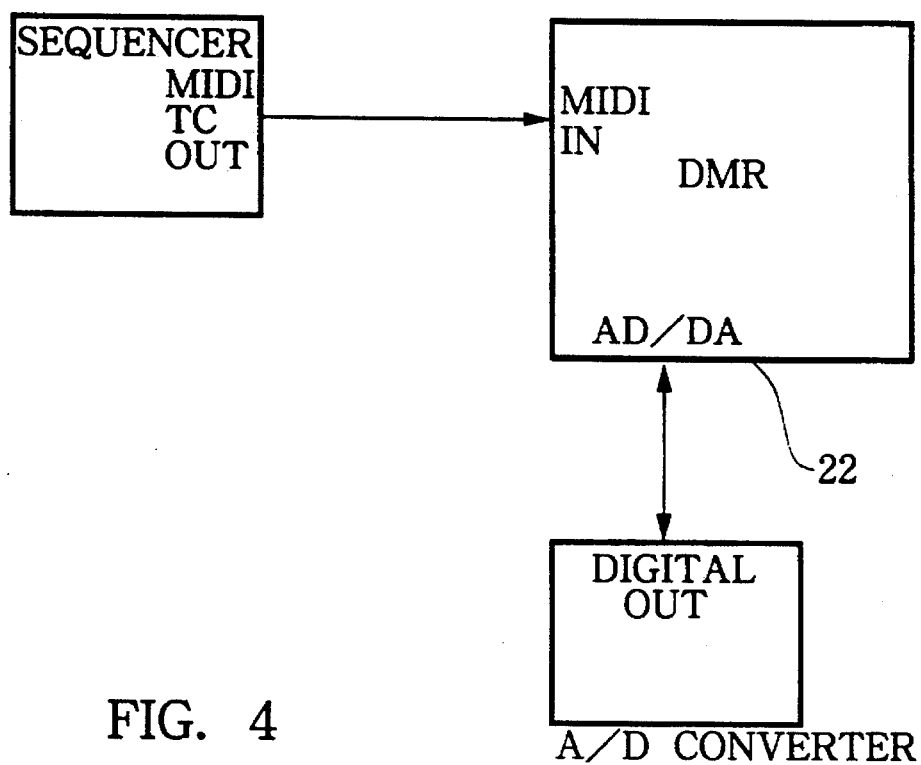
FIG. 4 is a circuit diagram showing an example of a MIDI time code synchronous connection.

2) MIDI time code (FIG. 4)

Except that MIDI code is used as an input code, there are basically not any differences from said point chase mode.

3) DMR synchronous mode

Figure 5:
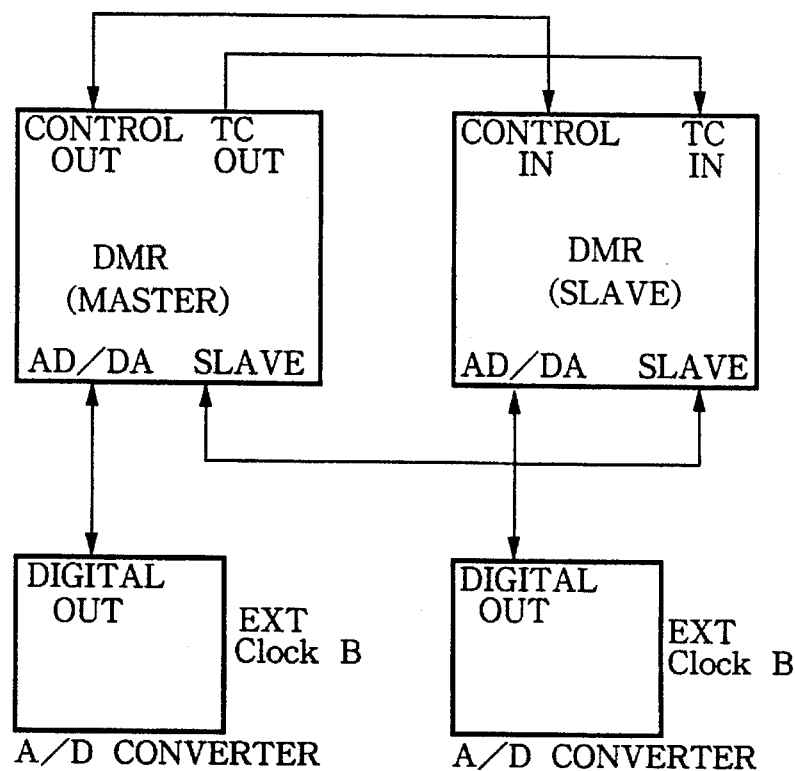
FIG. 5 is a circuit diagram showing an example of a parallel synchronous connection.

This mode includes i) parallel mode and ii) serial mode.

i) parallel mode (FIG. 5)

This mode is one wherein a plurality of DMRs in the relation of a slave and a master are connected in parallel and implement recording and playback simultaneously. If this mode is used, even when for example each of two DMRs has eight channels and is equipped with a tape capable of twenty minutes recording, it is enabled to achieve twenty minutes recording at sixteen channels.

When the slave apparatus starts its operation, since the slave does not chase the master promptly but raises the clock frequency of each of the clocks by $\frac{1}{100}$ octave to chase the master, it takes a certain time to follow the master.

ii) serial mode

This mode is one wherein one DMR is always made to operate at a time in a case where a plurality of DMRs are connected irrespective of the presence of the relation of a master and a slave. Accordingly, for example, if each of two DMRs has eight channels and is equipped with a tape capable of twenty minutes recording, it is possible for the DMRs to achieve forty minutes recording at eight channels. This mode comprises a) auto mode and b) manual mode.

Figure 6:
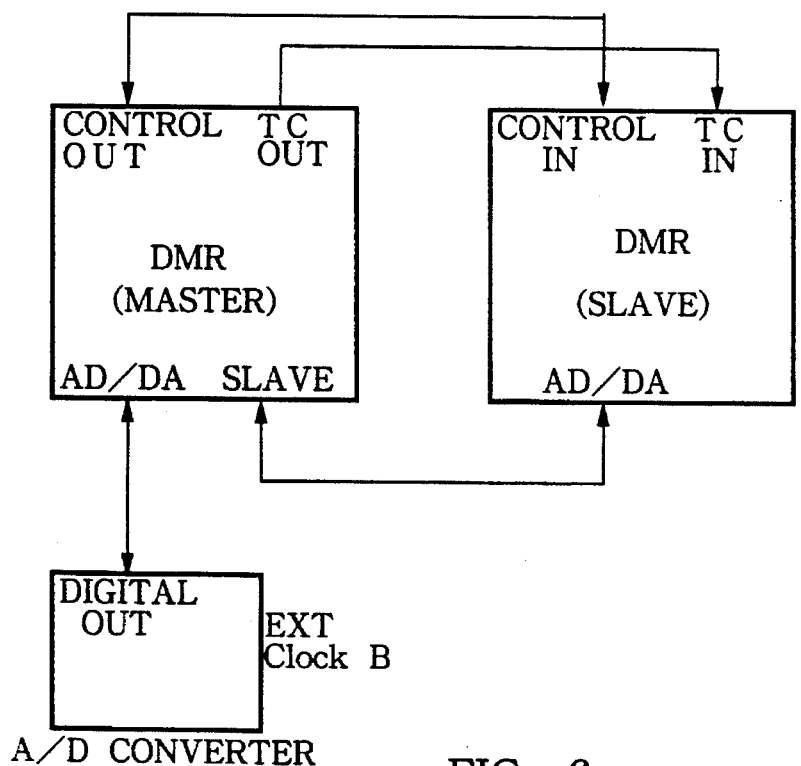
FIG. 6 is a circuit diagram showing an example of a serial synchronous connection.

As in the case of the parallel mode, when the slave apparatus starts its operation, since the slave does not chase the master promptly but raises the clock frequency of each of the clocks by $\frac{1}{100}$ octave to chase the master, the slave apparatus takes a certain time to follow the master.

a) auto mode (FIG. 6)

Figure 7:
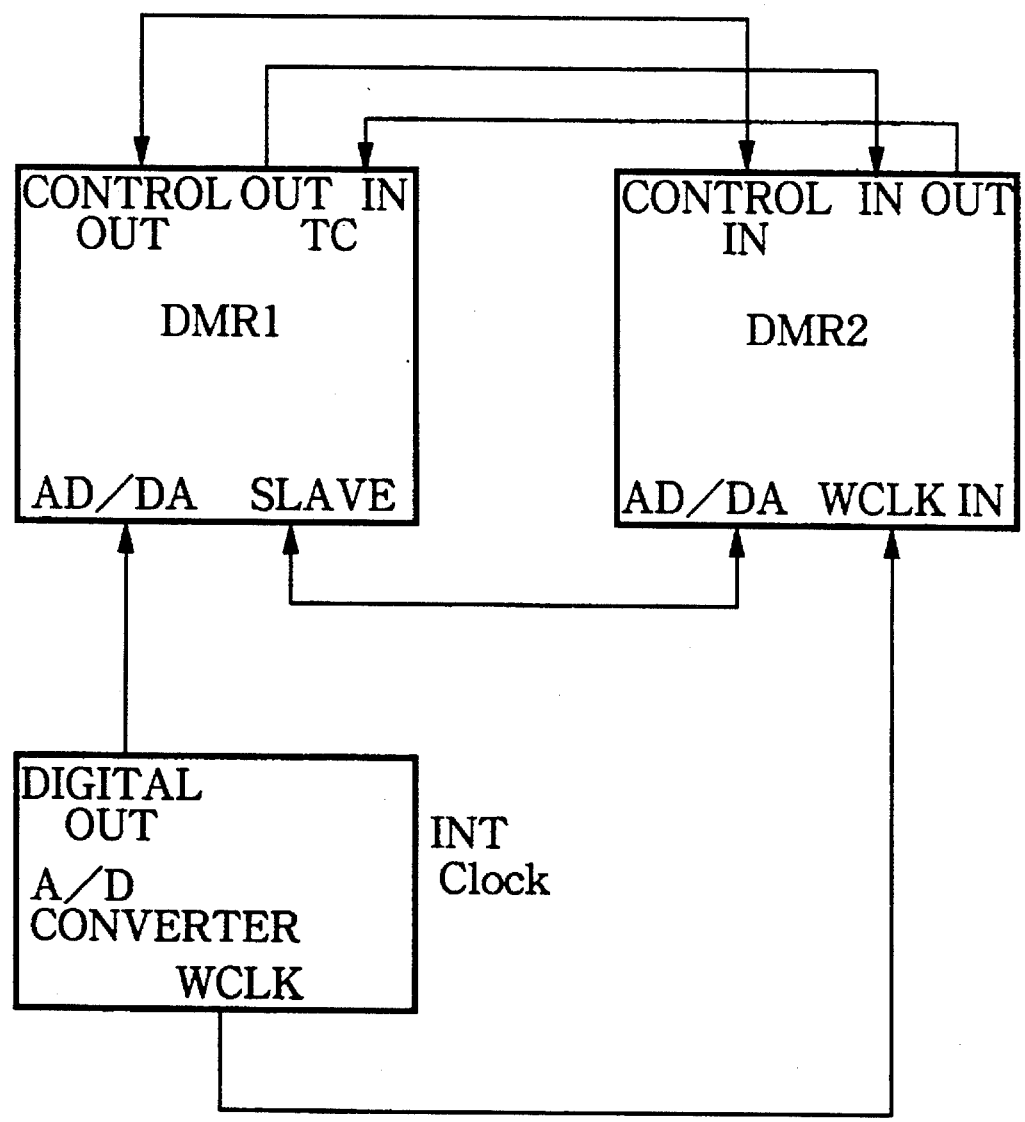
FIG. 7 is a circuit diagram showing an example of a manual synchronous connection.

This mode is one wherein a plurality of DMRs are placed under a so-called standby condition by connecting in a relation of master and slave and setting up a recording or playback beginning time (in point) or slave in advance, then the slave is caused to operate when the beginning time so set becomes equal to a time code supplied through the master. Even if the master finishes its operation, the clock continues to be supplied to the slave.

b) manual mode (FIG. 7)

Without setting up the relation of master and slave DMRs, one DMR is in operation (recording or playback) while another DMR is in stop mode. On the occasion of recording, the operation of the other DMR starts with manual operation. On the occasion of playing back, the playback of the slave starts when the position of the tape installed in the slave coincides with the value of an external time code.

Figure 8:
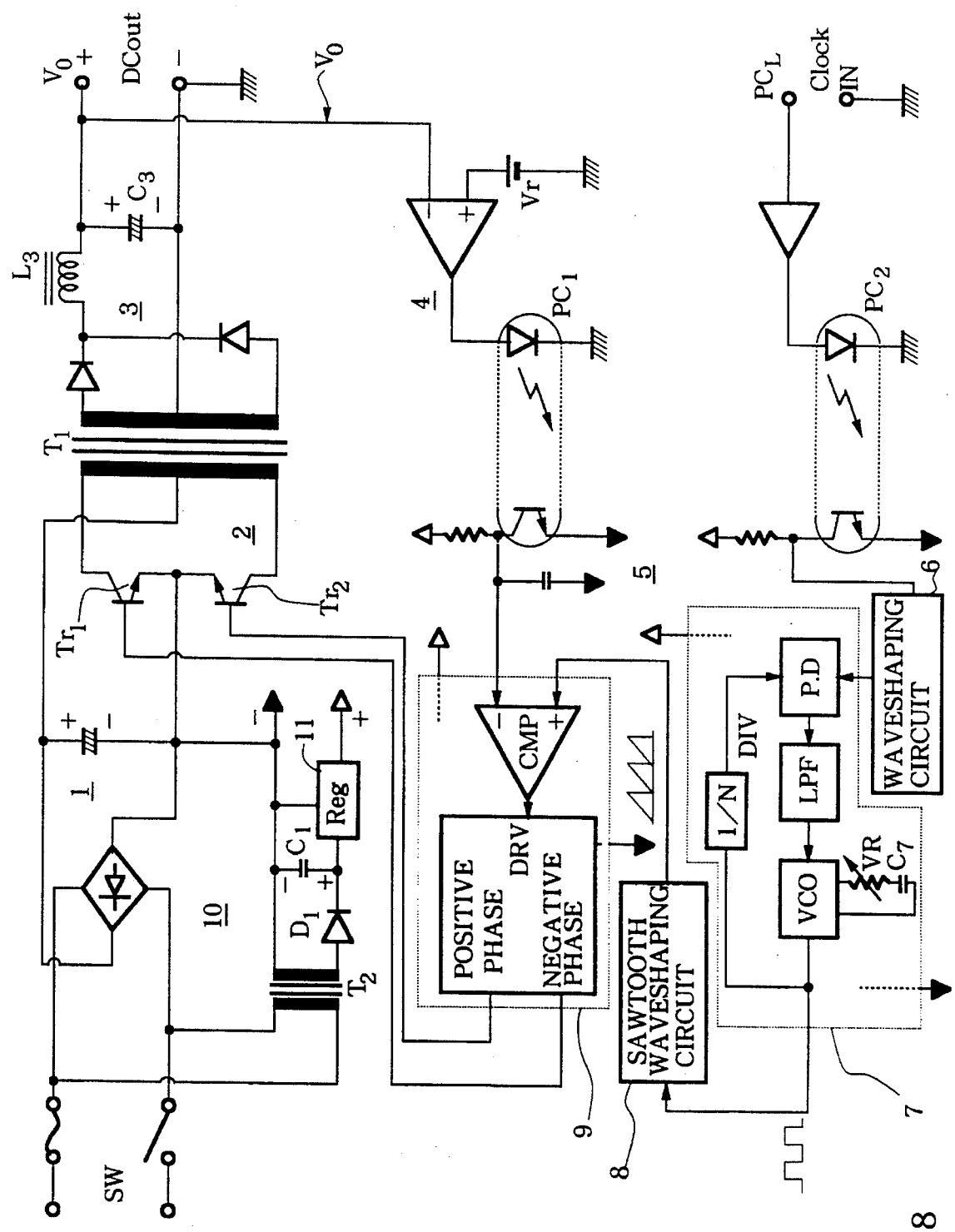
FIG. 8 is a circuit diagram of a power source apparatus according to the present invention.

FIG. 8 shows an embodiment of a power source apparatus according to the present invention.

The power source apparatus includes a DC power source unit 1 consisting of a capacitor input full-wave rectifier, an inverter 2 for inverting a DC power of the DC power source unit 1 into an AC power, a rectifier 3 for re-converting an AC output from the inverter 2 into the DC power, an output voltage detector 4 for comparing a DC output voltage $V_o$ of the rectifier 3, i.e., the power source apparatus, with a reference voltage $V_r$ to detect an error voltage $V_{er}$ (=$V_r$−$V_o$), and a controller 5 for controlling an output from the inverter 2. The power source apparatus further includes photocouplers $PC_1$ and $PC_2$ for insulating a primary (AC power source) side from a secondary (load) side. The inverter 2 includes switching transistors $T_{r1}$ and $T_{r2}$, and an output transformer $T_1$ for push-pull coupling, AC output stepdown, and primary/secondary side insulation.

When the DMR is connected to external digital apparatuses, if there exist differences between said absolute times of the digital apparatuses, the apparatus in which the time is delayed sets up a goal value and raises its clock frequency by 1/100 octave every one sampling clock to set its absolute time to the standard time of the apparatuses. In the case of this apparatus the clock frequency changes in a range of 1/5–5 times when the time is delayed.

The controller 5 includes a clock input terminal $P_{CL}$ for receiving an internal clock of the digital processing apparatus (to be referred to as a main body apparatus hereinafter) on which the power source apparatus is mounted, e.g., a signal processing sampling clock, a waveshaping circuit 6 for shaping a clock to be applied to the clock input terminal $P_{CL}$, a PLL circuit 7 for outputting a rectangular wave having a frequency N times the frequency of the clock, a sawtooth waveshaping circuit 8 for shaping the rectangular-wave output from the PLL circuit 7 into a sawtooth wave, and a PWM block 9 for generating a pulse having a width corresponding to the error voltage $V_{er}$ on the basis of the sawtooth wave and the error voltage $V_{er}$.

An operation of the power source apparatus shown in FIG. 8 will be described hereinafter.

In this power source apparatus, when a power source switch SW is turned on, an AC power source voltage, e.g., AC 100 V is supplied to the DC power source unit 1 and an auxiliary power source circuit 10. The DC power source unit 1 rectifies the AC voltage of 100 V and supplies the rectified voltage to the inverter 2. The auxiliary power source circuit 10 causes a transformer $T_2$ to step down the AC voltage of 100 V to obtain a predetermined voltage. A DC voltage obtained by rectifying and smoothing the resultant predetermined voltage by a diode $D_1$ and a capacitor $C_1$ is stabilized by a constant-voltage circuit 11, and the stabilized voltage is supplied to the controller 5.

In the controller 5, therefore, a voltage-controlled oscillator VCO in the PLL circuit 7 starts oscillation. An oscillation frequency immediately after the power source is turned on, i.e., a free-running frequency of the PLL circuit 7 when a clock signal is not input from the main body apparatus, is preset by a variable resistor VR and a capacitor $C_7$. For example, when the main body apparatus is a digital audio equipment, the free-running frequency is preset to be a frequency substantially N times (N is an integer of 1 or more) a signal sampling frequency of the equipment, i.e., 48 kHz or 44.1 kHz. The rectangular-wave output from the voltage-controlled oscillator VCO is supplied to the sawtooth waveshaping circuit 8.

In the sawtooth waveshaping circuit 8, after the rectangular-wave output is shaped to be a sawtooth wave having a frequency two times (2$f_o$) a frequency $F_o$ of the rectangular-wave output, the resultant output is supplied to the non-inverting (positive side) input terminal of a comparator CMP in the PWM block 9.

The error voltage output $V_{er}$ from the voltage detector 4 is input to the inverting (negative side) input terminal of the comparator CMP through the insulating photocoupler $PC_1$. For this reason, an output from the comparator CMP generates a pulse set at "H" level during only a duration wherein an instantaneous voltage of the sawtooth wave is higher than the error voltage output $V_{er}$. In other words, the lower the output voltage $V_o$ is, the larger the pulse width, and the higher the output voltage $V_o$ is, the smaller the pulse width. This pulse is alternately supplied to the bases of the switching transistors $T_{r1}$ and $T_{r2}$ in the inverter 2 through a drive circuit DRV.

In the inverter 2, therefore, a primary winding $W_1$ of the output transformer $T_1$ is driven in the positive or negative direction (upper or lower direction in FIG. 1) at the frequency $F_o$ half the frequency ($2f_o$) of the sawtooth wave, and a rectangular-wave AC output having a frequency $F_o$ is generated at a secondary winding $W_2$.

The rectifier 3 rectifies the AC output, and the main body apparatus receives a DC output from the rectifier 3 to start an operation.

During the operation, the power source apparatus causes the voltage detector 4 to detect the output voltage $V_o$, and causes the comparator CMP in the PWM block 9 to generate a pulse having a width corresponding to the output voltage $V_o$ to drive the bases of the transistors $T_{r1}$ and $T_{r2}$ in the inverter 2 in response to the pulse. In other words, an ON duty ratio of the transistors $T_{r1}$ and $T_{r2}$ is controlled in accordance with the output voltage $V_o$. For example, when the output voltage $V_o$ is lower then the reference voltage $V_r$, the error voltage $V_{er}$ is reduced. A duration wherein the voltage of the above-mentioned sawtooth wave is higher than the error voltage $V_{er}$ is prolonged, and the width of the pulse output from the comparator CMP is increased. For this reason, an ON duty ratio of the transistors $T_{r1}$ and $T_{r2}$ is increased. Since a low-pass filter consisting of an inductor $L_3$ and a capacitor $C_3$ is used as a smoothing circuit in the rectifier 3, only a DC component in the output obtained by fullwave rectifying an induction output of the secondary winding $W_2$ of the output transformer $T_1$ is output as a DC output. Therefore, when the ON duty ratio is increased, the DC output voltage is increased. On the other hand, when the output voltage $V_o$ is higher than the reference voltage $V_r$, the error voltage $V_{er}$ is increased, and a duration wherein the voltage of the above-mentioned sawtooth wave is higher than the error voltage $V_{er}$ is shortened, thus decreasing the pulse width of the pulse output from the comparator CMP. For this reason, the ON duty ratio of the transistors $T_{r1}$ and $T_{r2}$ is decreased, and the DC output voltage of the rectifier 3 is reduced. Thus, in the power source apparatus, negative-feedback control is performed so that the output voltage $V_o$ is equal to the reference voltage $V_r$, and the output voltage $V_o$ is stabilized.

The above operations are the same as those of the conventional switching power source. Thus, as compared with a conventional DC stabilized power source in which a transistor is connected in series with a load, and the transistor is subjected to variable-impedance control to stabilize an output, in the power source apparatus of the present invention, small-sized circuit elements can be used as a transformer, a capacitor, an inductor in a main circuit. Each circuit element may be as small as for an output frequency of the inverter, e.g., 20 to 200 kHz. In addition, since the pulse width of each of the transistors $T_{r1}$ and $T_{r2}$ is controlled so as to keep the voltage of the DC output constant, high efficiency operation can be achieved with a small loss. However, the conventional switching power source has a switching frequency of, e.g., 20 to 200 kHz, and this frequency is set to be independent from the frequency of the clock generated in the main body apparatus serving as a load. Therefore, a beat is generated between the switching frequency and the clock frequency and the like in the main body apparatus. If the beat is generated in an audio frequency band, the beat may be heard as noise.

The clock input terminal $P_{CL}$ and the PLL circuit 7 are arranged in the apparatus shown in FIG. 8 to cause the switching frequency to coincide with a frequency N times the frequency of the clock supplied to the clock input terminal $P_{CL}$ from the main body apparatus.

More specifically, as described above, when the power switch SW is turned on, the inverter 2 starts operation, and a DC output from the rectifier 3 is supplied to the main body apparatus, the main body apparatus starts an operation to generate a clock such as a signal sampling clock. In the controller 5, the clock is applied to the clock input terminal $P_{CL}$, and the clock is supplied to the waveshaping circuit 6 through a buffer amplifier $A_1$ and the insulating photocoupler $PC_2$. After a waveform is shaped in the waveshaping circuit 6, the resultant waveform is supplied to one input terminal of a phase detector PD in the PLL circuit 7.

The other input terminal of the phase detector PD receives a signal obtained by frequency-dividing an output from the voltage-controlled oscillator VCO by a frequency divider DIV into 1/N the frequency of the output. The phase detector PD outputs a signal corresponding to a difference between the phases of these two input signals. The phase detector PD is, e.g., a multiplier, and outputs a product of the two inputs as a signal corresponding to the phase difference. The low-pass filter LPF causes only a DC component of the signal corresponding to the phase difference to pass, and supplies this component to a frequency control voltage input terminal of the voltage-controlled oscillator VCO. Therefore, the oscillation frequency $f_o$ of the voltage-controlled oscillator VCO, i.e., the switching frequency is phase-locked at a frequency N times the clock frequency supplied from the main body apparatus. Therefore, a difference between the switching frequency and the clock frequency or its harmonic component is "0" or falls within a range except for the audio band. As a result, a beat is not generated, or even if a beat is generated, the beat is not recognized as noise because the beat is generated in a range except for the audio band.

When the clock of the main body apparatus is changed, the oscillation frequency of the voltage-controlled oscillator VCO in the PLL circuit 7 follows the change in clock substantially in real time (e.g., within a range of several Hz or less). Therefore, noise due to the beat is not generated.

Note that the present invention is not limited to the above embodiment, the various changes and modifications can be made.

For example, although an output voltage is stabilized in the above embodiment, the present invention can be applied when an electrical amount such as an output current or load power, or a desired physical amount except for the electrical amount such as a temperature or a luminance of a load is stabilized.

In addition, although the present invention is applied to a push-pull type switching regulator in the above embodiment, this invention can be applied to a chopper-type one-stone switching regulator (a step-down type or a step-up type), or a DC-to-DC converter for only transforming a DC voltage by using an output transformer.

In addition, if the clock is frequency-divided into 1/M and the resultant clock is input to a synchronization circuit such as a PLL circuit, a switching frequency can be set N/M (each of M and N is an integer of 1 or more) the clock frequency. As a result, a switching frequency which is optimum for prevention of beat noise can be set.

What is claimed is:

1. A power source apparatus for use in a digital audio recording apparatus, the digital audio recording apparatus including a variable speed drive being driven by an external sampling clock signal having a frequency used in digital audio equipment, wherein the speed of the drive varies in accordance with the external sampling clock signal, the power source apparatus comprising:

a DC power source;

a switching arrangement coupled to the DC power source for switching at a variable switching frequency to provide a DC output signal;

clock means for providing a clock signal substantially at the external sampling clock frequency; and a controller, responsive to the clock signal having the external sampling clock frequency, for controlling the switching frequency of the switching arrangement to be about an integer multiple of the external sampling clock frequency.

2. The power source apparatus as defined in claim 1, wherein the switching arrangement includes chopping means for chopping an output from the DC power source to control the DC output signal.

3. The power source apparatus as defined in claim 1, wherein the switching arrangement includes first converting means for converting an output from the DC power source to an AC signal, and second converting means for converting the AC signal to the DC output signal.

4. The power source apparatus as defined in claim 1, wherein the controller includes signal generating means for generating a switching signal having a frequency which is about the integer multiple of the external sampling clock frequency, and means for applying the switching signal to the switching arrangement.

5. The power source apparatus as defined in claim 4, further comprising reference signal generating means for providing a reference signal and comparing means for comparing the reference signal with the DC output signal to provide an error signal, wherein the controller includes means for pulse width modulating the switching signal in accordance with the error signal.

6. A power source apparatus for use in a digital audio recording apparatus, the digital audio recording apparatus including a variable speed drive mechanism being driven by a dock frequency which is variable in accordance with a sampling frequency in an external audio system, wherein the speed of the drive mechanism varies in accordance with the sampling frequency, the power source apparatus comprising:

a DC power source;

a DC to AC inverter coupled to the DC power source and having a pair of switching transistors;

an AC to DC rectifier coupled to the DC to AC inverter and providing a DC output signal; and clock means for providing a clock signal for switching the pair of switching transistors at a frequency which is about an integer multiple of the sampling frequency.

7. The power source apparatus as defined in claim 6, wherein the clock means includes a phase locked loop for generating a pulse train having a frequency which is about the integer multiple of the sampling frequency.

8. The power source apparatus as defined in claim 7, further comprising:

voltage supply means for providing a reference voltage; and error voltage generating means for generating an error voltage in accordance with a difference between the reference voltage and the voltage of the DC output signal, wherein the clock means includes a pulse width modulator for pulse width modulating the pulse train in accordance with the error voltage.

9. The power source apparatus as defined in claim 8, wherein the clock means includes shaping means coupled to the phase locked loop for shaping the pulse train to produce a sawtooth waveform.

10. A digital audio system comprising:

a digital audio recording apparatus including a variable speed drive being driven by an external sampling clock signal having a frequency used in digital audio equipment, wherein the speed of the drive varies in accordance with the external sampling clock signal; and a power source apparatus, said power source apparatus including:

a DC power source;

a switching arrangement coupled to the DC power source for switching at a variable switching frequency to provide a DC output signal;

clock means for providing a clock signal substantially at the external sampling clock frequency; and a controller, responsive to the clock signal having the external sampling clock frequency, for controlling the switching frequency of the switching arrangement to be an integer multiple of the external sampling dock frequency, thereby preventing the switching frequency of the switching arrangement from causing the generation of noise in the audio frequency range.

* * * * *